(12) United States Patent
Yokomizo

(10) Patent No.: US 12,022,044 B2
(45) Date of Patent: Jun. 25, 2024

(54) IMAGE RECEPTION APPARATUS, IMAGE TRANSMISSION APPARATUS, METHOD, AND RECORDING MEDIUM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 17/529,105

(22) Filed: Nov. 17, 2021

(65) Prior Publication Data

US 2022/0166899 A1 May 26, 2022

(30) Foreign Application Priority Data

Nov. 25, 2020 (JP) ................................. 2020-195015

(51) Int. Cl.
 *H04N 1/40* (2006.01)
 *H04N 1/32* (2006.01)
 *H04N 1/333* (2006.01)

(52) U.S. Cl.
 CPC ..... *H04N 1/40068* (2013.01); *H04N 1/32363* (2013.01); *H04N 1/33315* (2013.01)

(58) Field of Classification Search
 CPC ........... H04N 1/40068; H04N 1/32363; H04N 1/33315

See application file for complete search history.

(56) References Cited

U.S. PATENT DOCUMENTS

| | | | | |
|---|---|---|---|---|
| 2017/0329208 A1* | 11/2017 | Takahashi | ............. | G06F 3/1423 |
| 2019/0387153 A1* | 12/2019 | De Mers | ................ | H04N 23/62 |
| 2020/0264108 A1* | 8/2020 | Hoshino | ............ | G01N 21/8803 |
| 2021/0385434 A1* | 12/2021 | Nakamura | ............. | H04N 19/46 |

FOREIGN PATENT DOCUMENTS

JP 2016058994 A 4/2016

* cited by examiner

*Primary Examiner* — Akwasi M Sarpong
*Assistant Examiner* — Michael L Burleson
(74) *Attorney, Agent, or Firm* — Canon U.S.A., Inc. IP Division

(57) ABSTRACT

An image reception apparatus including a reception unit that receives a first image from an image transmission apparatus and a transmission unit that transmits information on an attention area designated by a user in the first image to the image transmission apparatus. When the transmission unit transmits the information to the image transmission apparatus, the reception unit receives, from the image transmission apparatus, the first image together with one or more partial images corresponding to the attention area and constituting a second image of a resolution higher than a resolution of the first image.

15 Claims, 11 Drawing Sheets

IMAGE RECEPTION APPARATUS, IMAGE TRANSMISSION APPARATUS, METHOD, AND RECORDING MEDIUM

BACKGROUND

Field of the Disclosure

The present disclosure relates to an image reception apparatus, an image transmission apparatus, a method, and a recording medium.

Description of the Related Art

Japanese Patent Laid-Open No. 2016-58994 discloses a technique in which a surveillance camera device generates high-quality image data and low-quality image data from the same image signal and records these pieces of image data and in which a management server performs switching based on a determination as to whether to use, as image data to be distributed, the low-quality image data or the high-quality image data.

SUMMARY

An image reception apparatus according to an embodiment of the present disclosure includes a reception unit configured to receive a first image from an image transmission apparatus; and a transmission unit configured to transmit information on an attention area designated by a user in the first image to the image transmission apparatus. When the transmission unit transmits the information to the image transmission apparatus, the reception unit receives, from the image transmission apparatus, the first image together with one or more partial images corresponding to the attention area and constituting a second image of a resolution higher than a resolution of the first image.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings.

Embodiments of the present disclosure will be described in detail below with reference to the accompanying drawings. Note that the following embodiments are not intended to limit the present disclosure and that all combinations of features to be described in the embodiments are not necessarily essential to a solution provided by the present disclosure. Configurations according to the embodiments can be appropriately modified or changed in accordance with specifications or various conditions (such as conditions of use and a use environment) of an apparatus to which the present disclosure is applied. The technical scope of the present disclosure is defined by the claims and is not limited by the following individual embodiments.

First Embodiment

Figure 1:
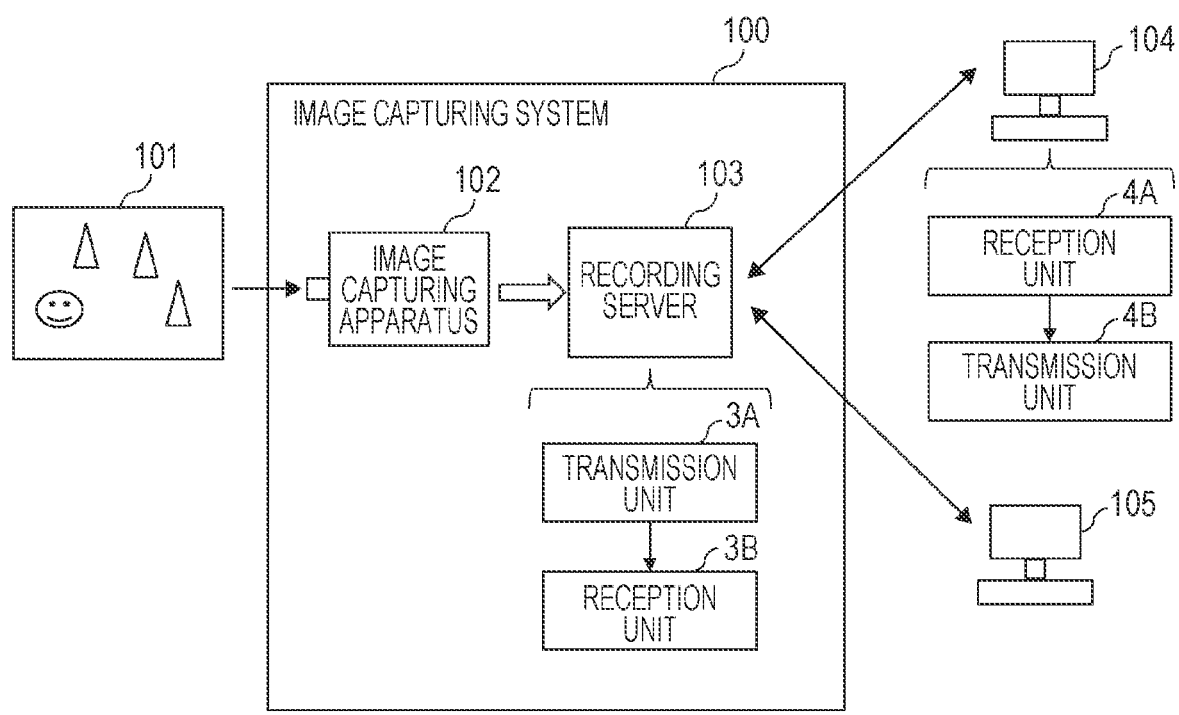
FIG. 1 is a block diagram illustrating an example of a configuration of an image distribution system according to a first embodiment.

FIG. 1 is a block diagram illustrating an example of a configuration of an image distribution system according to a first embodiment.

In FIG. 1, the image distribution system includes an image capturing system 100, and clients 104 and 105. The image capturing system 100 includes an image capturing apparatus 102 and a recording server 103. Incidentally, although two clients 104 and 105 are illustrated in the example of FIG. 1, one, or three or more clients may be included. Furthermore, although the clients 104 and 105 are disposed outside the image capturing system 100 in the example of FIG. 1, the clients 104 and 105 may be incorporated into the image capturing system 100.

The image capturing system 100 captures an image of a scene 101 to be imaged and stores captured images of multiple resolutions. The image capturing system 100 distributes an image to each of the clients 104 and 105. At this time, the image capturing system 100 can transmit, to each of the clients 104 and 105, a tile image closest to an attention area requested from each of the clients 104 and 105. Here, as the resolution of a captured image of the same scene 101 to be imaged increases, the image capturing system 100 can increase the number of tiles.

The image capturing system 100 transmits, to each of the clients 104 and 105, a tile image including the attention area requested from each of the clients 104 and 105 and having a highest resolution.

Thus, even if each of the clients 104 and 105 clips an image area and provides an enlarged display, a reduction in the effective resolution of a captured image can be inhibited.

The image capturing apparatus 102 captures an image of the scene 101 to be imaged and generates captured images of multiple resolutions for the same scene 101 to be imaged. After that, the image capturing apparatus 102 transmits the captured images to the recording server 103. At this time, the image capturing apparatus 102 can store, in the recording server 103, an entire image, and tile image groups obtained by dividing one or more images of a resolution higher than the resolution of the entire image. For example, the image capturing apparatus 102 can store, in the recording server 103, an entire image as a low-resolution image, and, as a high-resolution image, a tile image group obtained by dividing the entire image.

Furthermore, the image capturing apparatus 102 can encode the entire image and each tile image group by switching between at least intra-frame coding and inter-frame encoding. For example, to ensure high compression ratios, the image capturing apparatus 102 can use a compression method, such as H.264, in which intra-frame compression and inter-frame compression are combined.

The recording server 103 stores an entire image and tile image groups output from the image capturing apparatus 102. Furthermore, the recording server 103 can receive a request from each of the clients 104 and 105 and transmit a requested image to each of the clients 104 and 105. Here, the recording server 103 receives a request for a high-resolution image included in a partial area of a low-resolution image from the clients 104 and 105. This high-resolution image is, for example, a tile image generated by dividing the area of the low-resolution image, such as the entire image. This tile image may be an intra-frame compressed image or may be an inter-frame compressed image. The recording server 103 outputs a low-resolution image including an area outside the range of the high-resolution image to each of the clients 104 and 105 and then outputs the high-resolution image to each of the clients 104 and 105. Furthermore, the area outside the range of the high-resolution image is, for example, an area including one or more tiles adjacent to the tile of the high-resolution image. The area outside the range of the high-resolution image may be the area of the entire image.

Here, the recording server 103 includes a transmission unit 3A and a reception unit 3B. The transmission unit 3A transmits a low-resolution image to each of the clients 104 and 105. The reception unit 3B receives, from each of the clients 104 and 105, information on an attention area designated by a user in the low-resolution image. Here, when the reception unit 3B receives the information on the attention area designated by the user, the transmission unit 3A transmits, to each of the clients 104 and 105, the low-resolution image together with one or more partial images corresponding to the attention area and constituting a high-resolution image.

At this time, when a destination of the attention area designated by the user is within the range of the one or more partial images, the transmission unit 3A may transmit the low-resolution image together with the one or more partial images to each of the clients 104 and 105. Furthermore, when a destination of the attention area designated by the user is outside the range of the one or more partial images, the transmission unit 3A may transmit the low-resolution image to each of the clients 104 and 105. At this time, the transmission unit 3A transmits the low-resolution image to each of the clients 104 and 105 and may transmit new one or more partial images corresponding to the area of the destination of the attention area and constituting a high-resolution image.

Each of the clients 104 and 105 makes a request to the image capturing system 100 for acquisition of an image and displays the image acquired from the image capturing system 100. At this time, each of the clients 104 and 105 can enlarge or reduce the image on a display screen or can designate an attention area. Then, each of the clients 104 and 105 can acquire a tile image closest to the designated attention area from the image capturing system 100 and can display the tile image. Each of the clients 104 and 105 may be a general-purpose computer, such as a personal computer, or may be a mobile terminal, such as a smartphone or tablet.

Furthermore, each of the clients 104 and 105 can support a digital pan-tilt (PT) movement in which a clipped image position is moved in a pan direction and in a tilt direction.

For example, when each of the clients 104 and 105 subjects an image clipped from a tile of a high-resolution image to a digital PT movement, each of the clients 104 and 105 can perform switching to another tile of the high-resolution image.

Here, for example, the client 104 makes a request to the image capturing system 100 for a high-resolution image included in a partial area of a low-resolution image. Then, the client 104 acquires, from the image capturing system 100, a low-resolution image including an area outside the range of the high-resolution image and displays the low-resolution image. Subsequently, the client 104 acquires, from the image capturing system 100, the high-resolution image for which the client 104 has made the request to the image capturing system 100 and performs switching to a display of the high-resolution image.

Here, the client 104 includes a reception unit 4A and a transmission unit 4B. The reception unit 4A receives a low-resolution image from the recording server 103. The transmission unit 4B transmits information on an attention area designated by the user in the low-resolution image to the recording server 103. Here, when the transmission unit 4B transmits the information on the attention area designated by the user, the reception unit 4A receives, from the recording server 103, the low-resolution image together with one or more partial images corresponding to the attention area and constituting a high-resolution image.

At this time, when a destination of the attention area designated by the user is within the range of the one or more partial images, the client 104 may cause the one or more partial images to be displayed. Furthermore, when a destination of the attention area designated by the user is outside the range of the one or more partial images, the client 104 may cause the low-resolution image to be displayed. At this time, the client 104 causes the low-resolution image to be displayed and may cause, after the reception unit 4A receives new one or more partial images corresponding to the area of the destination of the attention area and constituting a high-resolution image, the received new one or more partial images to be displayed.

The client 105 can be configured as in the client 104.

Here, an output from the image capturing apparatus 102 is an output based on a compression method in which intra-frame compression and inter-frame compression are combined. In this case, even when an image switching operation is performed, the client 104 is unable to perform image switching until receipt of an intra-frame compressed frame, and thus the user has to wait for an intra-frame compressed frame of an image to which switching is to be performed. In particular, when a digital PT movement is performed, images are frequently switched, and thus a waiting time for an intra-frame compressed frame is increased.

Here, when the client 104 makes a request to the image capturing system 100 for a high-resolution image included in a partial area of a low-resolution image, the image capturing system 100 outputs a low-resolution image including an area outside the range of the high-resolution image to the client 104. At this time, a waiting time for an intra-frame compressed frame for the low-resolution image is shorter than that for the high-resolution image. Thus, the image capturing system 100 can make a time period taken to output the low-resolution image shorter than a time period taken to output the high-resolution image and can reduce a time period for which the user has to wait. When the client 104 acquires the low-resolution image from the image capturing system 100, the client 104 displays the low-resolution image.

When output of a high-resolution image is enabled after the low-resolution image is output, the image capturing system 100 outputs the high-resolution image requested from the client 104 to the client 104. When the client 104 acquires the high-resolution image from the image capturing system 100, the client 104 switches the display of the low-resolution image to a display of the high-resolution image.

Thus, even if the client 104 performs an operation of clipping an image area and providing an enlarged display, a waiting time for image switching can be reduced, and the high-resolution image can also be checked after image switching.

Figure 2A:
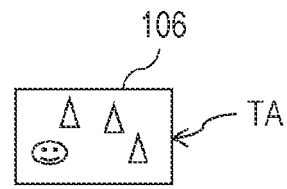
FIGS. 2A to 2C illustrate examples of division into tiles based on a resolution according to the first embodiment.
Figure 2B:
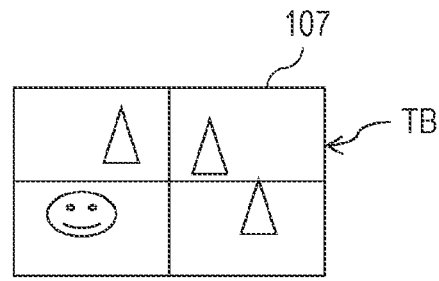
Figure 2C:
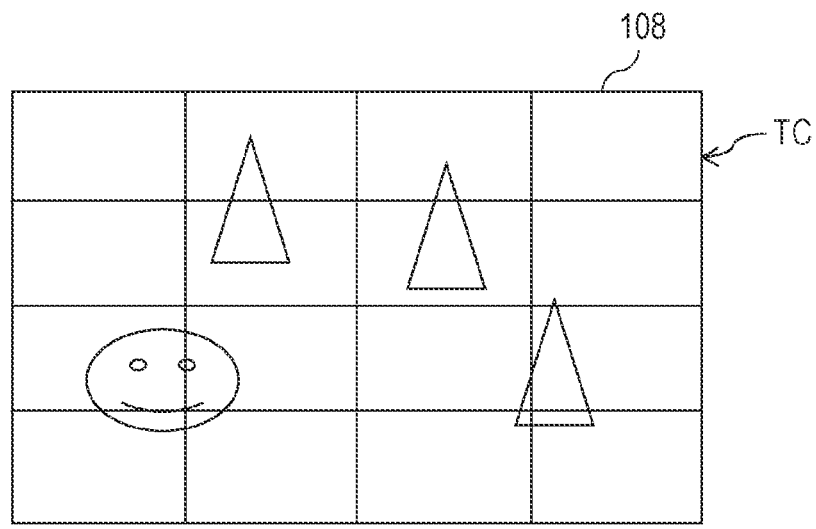

FIGS. 2A to 2C illustrate examples of division into tiles based on a resolution according to the first embodiment. In the examples of FIGS. 2A to 2C, the case is illustrated where the resolutions of images generated by the image capturing apparatus 102 in FIG. 1 refer to three resolution levels.

The image capturing apparatus 102 generates, for example, an image 106 of a low resolution in FIG. 2A, an image 107 of a medium resolution in FIG. 2B, and an image 108 of a high resolution in FIG. 2C. Here, the image capturing apparatus 102 increases a layer number assigned to each image as the resolution of the image increases. For example, the image 106 of the lowest resolution can be regarded as a layer L1, the image 107 of the medium resolution can be regarded as a layer L2, and the image 108 of the highest resolution can be regarded as a layer L3. At this time, the image capturing apparatus 102 generates, for example, the entire image 106 of the layer L1 as a tile image TA. Furthermore, the image capturing apparatus 102 divides, for example, the image 107 of the layer L2 into four tiles and generates a tile image TB for each tile obtained by division. Furthermore, the image capturing apparatus 102 divides, for example, the image 108 of the layer L3 into 16 tiles and generates a tile image TC for each tile obtained by division. The image capturing apparatus 102 compresses the tile images TA to TC by using a compressor capable of performing intra-frame compression and inter-frame compression, such as H.264, and transmits the tile images to the recording server 103. Incidentally, assuming that the maximum number of layers of an image is three and the number of divisions in a layer i is $n_i$, FIGS. 2A to 2C illustrate $n_1=1$, $n_2=4$, and $n_3=16$, however, the maximum number of layers and the number of divisions in each layer may be any numbers. Here, an image generated by the image capturing apparatus 102 is represented as $A_{ij}$, where i is a layer to which the image belongs and j is a tile number of the image.

Figure 3:
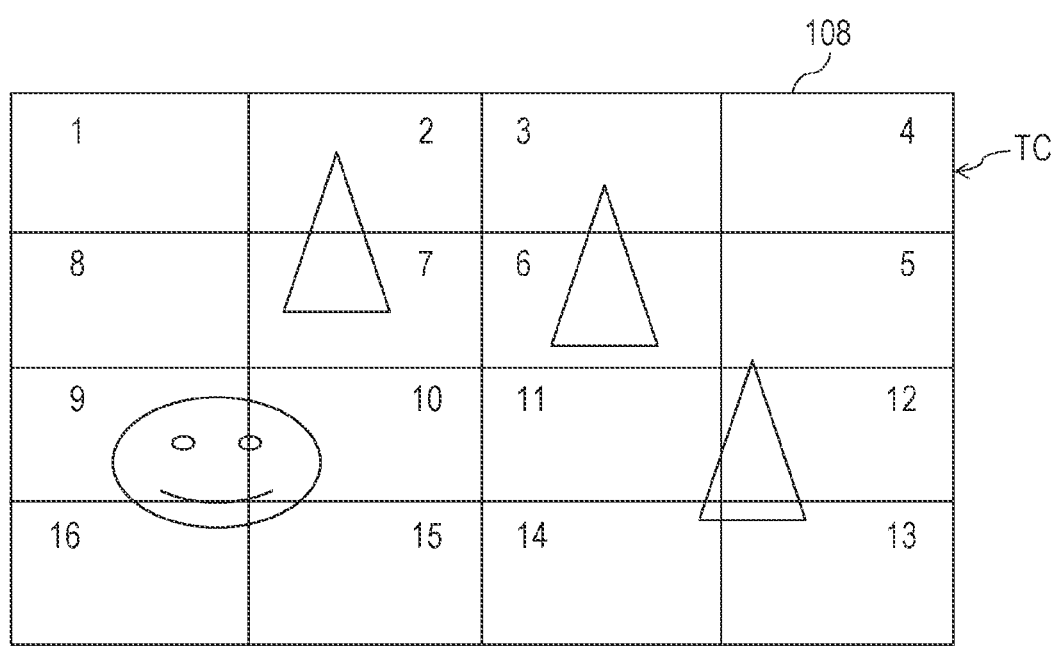
FIG. 3 illustrates an example of numbers assigned to tiles in FIG. 2C.

FIG. 3 illustrates an example of numbers assigned to the tiles in FIG. 2C.

In FIG. 3, for example, a tile number 1 is assigned to an upper left tile of the image 108 as a start point, and a next number 2 is assigned to a tile located immediately on the right of the tile. If there is no tile located immediately on the right, the number assignment turns at a tile whose number is 4 with no tile located immediately on the right of the tile, and a next number 5 is assigned to a tile located immediately below the tile. Then, a next number 6 is assigned to a tile located immediately on the left of the tile. At this time, the recording server 103 receives a sum total of $\Sigma n_i$ images from the image capturing apparatus 102 and records the images.

Figure 4:
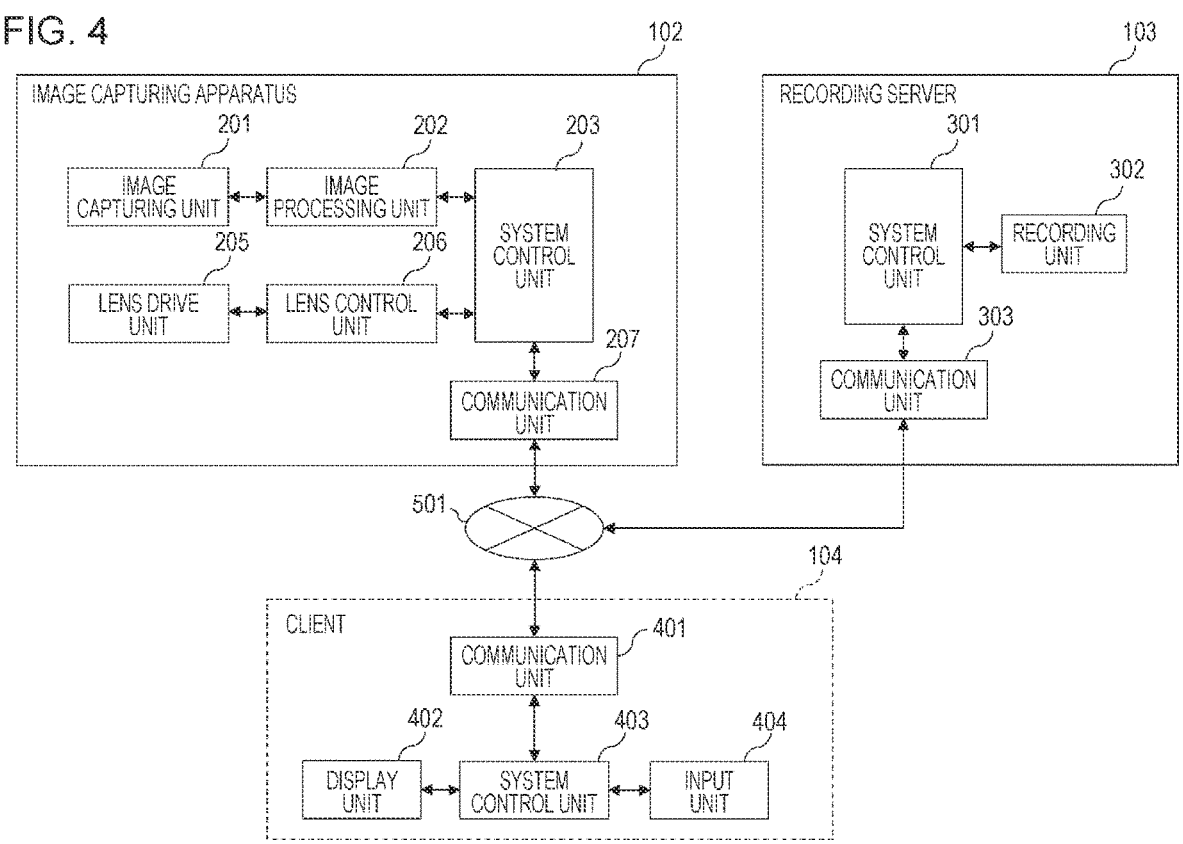
FIG. 4 is a block diagram illustrating an example of a configuration of an image capturing system and a client in FIG. 1.

FIG. 4 is a block diagram illustrating an example of a configuration of the image capturing system and a client in FIG. 1. Incidentally, although FIG. 4 does not illustrate the client 105 in FIG. 1, the client 105 can be configured as in the client 104.

Of functional blocks illustrated in FIG. 4, for functions implemented by software, a program for providing a function of each functional block is stored in a memory, such as a read only memory (ROM). The function is implemented by causing a central processing unit (CPU) to read the program into a random access memory (RAM) and execute the program. For functions implemented by hardware, a dedicated circuit only has to be automatically generated on an FPGA from a program for implementing a function of each functional block, for example, by using a certain compiler. FPGA stands for field programmable gate array. Furthermore, a gate array circuit is formed as in the FPGA and may implement, as hardware, a function. Furthermore, a function may be implemented by an application specific integrated circuit (ASIC). Incidentally, a configuration of the functional blocks illustrated in FIG. 4 is merely an example. A plurality of functional blocks may constitute one functional block, or any of the functional blocks may be divided into blocks that perform a plurality of functions.

In FIG. 4, the image capturing apparatus 102, the recording server 103, and the client 104 are connected in such a manner as to be able to communicate with one another via a network 501. The network 501 may be the Internet or may be a wide area network (WAN). Furthermore, the network 501 may be a local area network (LAN), such as a WiFi or Ethernet (registered trademark) network. Alternatively, the Internet, the WAN, and the LAN may coexist.

The image capturing apparatus 102 includes an image capturing unit 201, an image processing unit 202, a system control unit 203, a lens drive unit 205, a lens control unit 206, and a communication unit 207. The recording server 103 includes a system control unit 301, a recording unit 302, and a communication unit 303. The client 104 includes a communication unit 401, a display unit 402, a system control unit 403, and an input unit 404.

The image capturing unit 201 includes an optical system such as a lens and an iris, and an image capturing element. The image capturing element includes a semiconductor element, such as a charge-coupled device (CCD) sensor or complementary metal oxide semiconductor (CMOS) sensor, and a peripheral circuit. The image capturing unit 201 forms an optical image of a subject on the image capturing element and converts the optical image of the subject into an electrical signal for each pixel.

The image processing unit 202 performs, by using an electrical signal obtained through photoelectric conversion in the image capturing unit 201, image processing, generation of pieces of image data of multiple resolutions, division into tiles, and encoding processing, for example.

In the encoding processing, for example, a compression method, such as H.264, in which intra-frame compression and inter-frame compression are combined can be used.

The lens drive unit 205 drives the lens for focusing to bring an image into focus or drives the lens for zooming to change optical magnification.

The lens control unit 206 provides instructions, for example, about a focus position and a zoom value to the lens drive unit 205.

The system control unit 203 analyzes a camera control command and performs a process based on the command. For example, when the system control unit 203 receives a command to change a zoom value of the lens from the recording server 103, the system control unit 203 instructs the lens control unit 206 to change the zoom value to thereby drive the lens for zooming through the lens drive unit 205.

The communication unit 207 sends a plurality of tile images to the recording server 103 via the network 501. Furthermore, the communication unit 207 receives various commands transmitted from the recording server 103 or each of the clients 104 and 105 and transmits the commands to the system control unit 203.

The system control unit 301 receives tile images of multiple resolutions from the image capturing apparatus 102 through the communication unit 303 and instructs the recording unit 302 to store data. Furthermore, the system control unit 301 receives, through the communication unit 303, an instruction from each of the clients 104 and 105 to transmit a tile image and instructs the recording unit 302 to extract a designated tile image. Then, the system control unit 301 transmits, through the communication unit 303, the tile image acquired from the recording unit 302 to each of the clients 104 and 105.

When the recording unit 302 receives an instruction to store data from the system control unit 301, the recording unit 302 stores the data as recorded image data. Furthermore, when the recording unit 302 receives, from the system control unit 301, an instruction to extract a recorded image, the recording unit 302 transmits the recorded image to the system control unit 301.

The communication unit 303 receives a plurality of tile images from the image capturing apparatus 102 via the network 501. Furthermore, the communication unit 303 transmits a tile image to each of the clients 104 and 105 via the network 501.

The communication unit 401 receives various pieces of data distributed from the recording server 103. The various pieces of data include mainly data representing setting values of a camera, and image data.

The display unit 402 displays an image acquired from the recording server 103 or displays a graphical user interface (GUI) for performing camera control. The display unit 402 is, for example, a liquid crystal display device, an organic electroluminescence (EL) display, or a micro-light-emitting diode (LED) display.

The system control unit 403 causes the display unit 402 to display image data received from the recording server 103 via the communication unit 401. Furthermore, the system control unit 403 generates a camera control command in accordance with a GUI operation performed by the user and transmits the camera control command to the recording server 103 or the image capturing apparatus 102 via the communication unit 401.

In the input unit 404, for example, pointing devices, such as a keyboard and a mouse, are used. The user operates the GUI through the input unit 404. Incidentally, in the case of a mobile terminal, in the input unit 404, for example, a touch panel and various key buttons are used.

Thus, each of the clients 104 and 105 can, via the network 501, acquire a tile image from the recording server 103 or perform camera control of the image capturing apparatus 102.

FIG. 4 illustrates the case where the image capturing apparatus 102, the recording server 103, and the client 104 are connected to one another via the network 501. In addition, the client 104 may have a function of the recording server 103, or the client 104 may have functions of the image capturing apparatus 102 and the recording server 103. At this time, a process performed by the system control unit 301 may be configured so that the system control unit 403 can perform the process, or processes performed by the system control units 203 and 301 may be configured so that the system control unit 403 can perform the processes.

Figure 5:
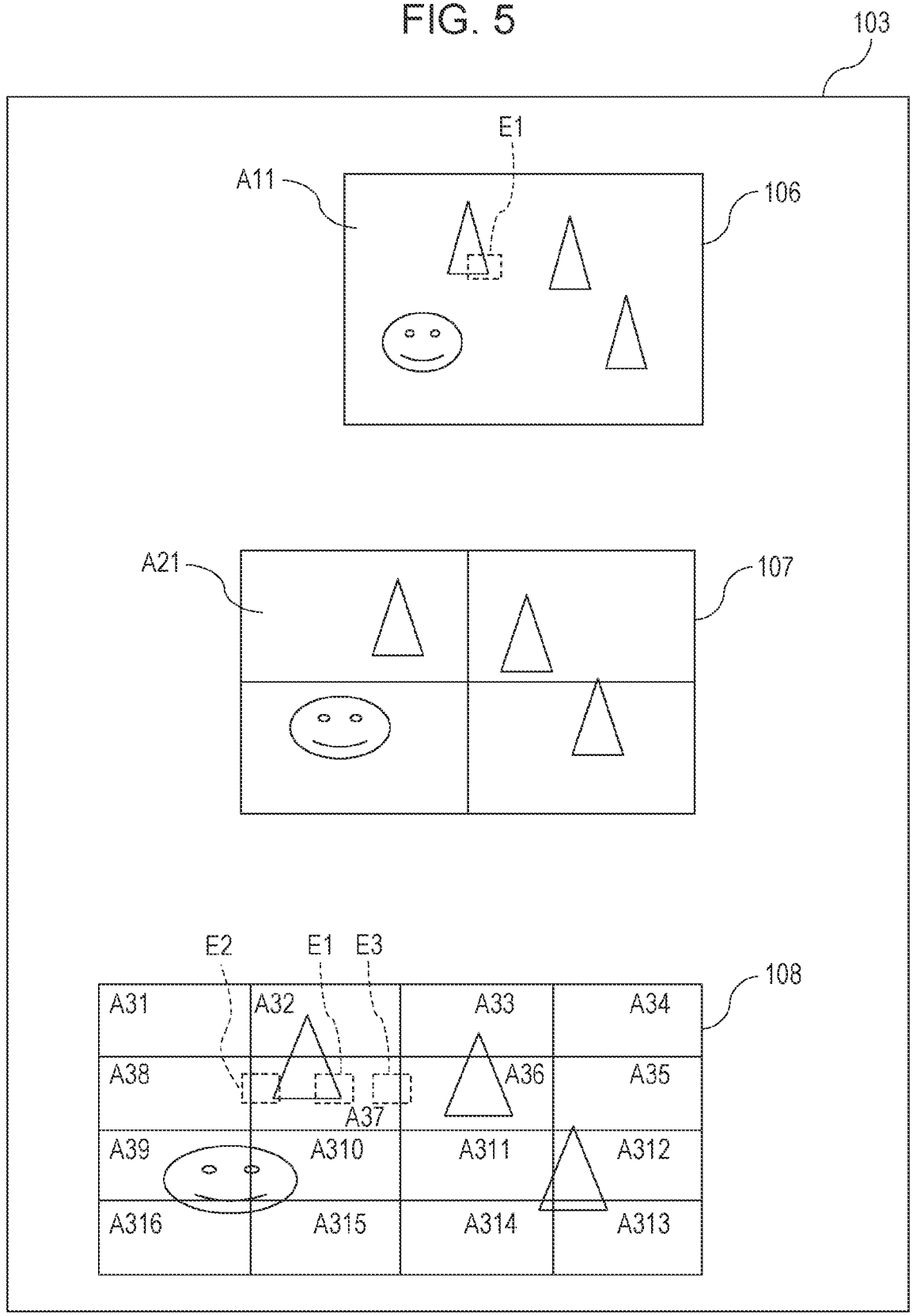
FIG. 5 illustrates an example of a tile image group stored in a recording server in FIG. 4.

FIG. 5 illustrates an example of a tile image group stored in the recording server in FIG. 4.

In FIG. 5, the recording server 103 stores tile images TA to TC of the layers L1 to L3 in the same format as the layers L1 to L3 in FIGS. 2A to 2C.

Figure 6:
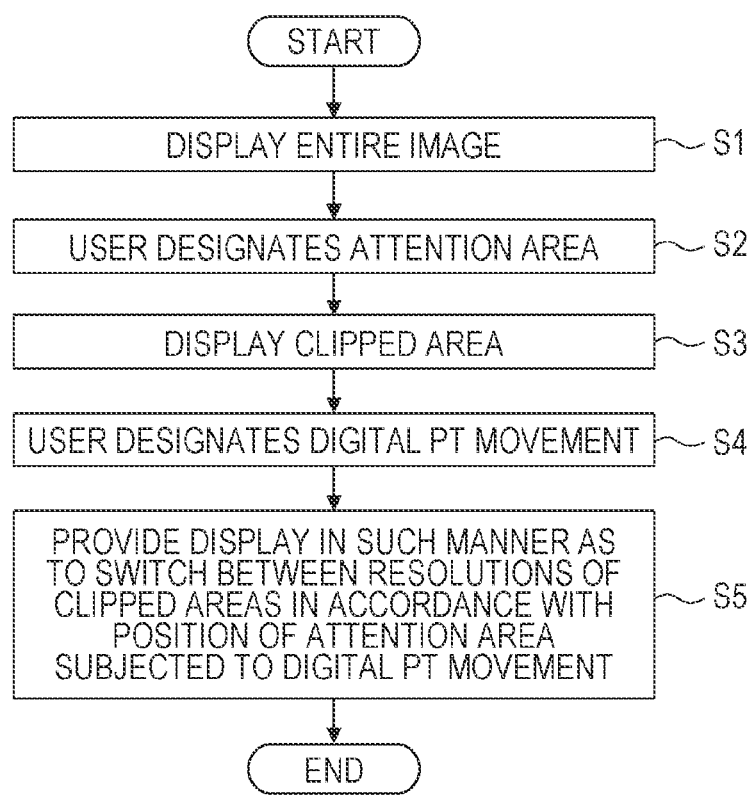
FIG. 6 is a flowchart illustrating an image display operation performed by a client according to the first embodiment.

FIG. 6 is a flowchart illustrating an image display operation performed by a client according to the first embodiment. In the following description, an operation of displaying tile images TA to TC in FIG. 5 will be appropriately described as an example.

Incidentally, steps in FIG. 6 are implemented by causing the system control unit 403 to read a program stored in a storage unit of the client 104 in FIG. 4 and execute the program. Furthermore, at least part of the flowchart illustrated in FIG. 6 may be implemented by hardware. In the case where the at least part of the flowchart is implemented by hardware, a dedicated circuit only has to be automatically generated on an FPGA from a program for implementing each step, for example, by using a certain compiler. Furthermore, a gate array circuit is formed as in the FPGA and may implement, as hardware, the at least part of the flowchart. Furthermore, the at least part of the flowchart may be implemented by an ASIC.

In this case, each block in the flowchart illustrated in FIG. 6 can be regarded as a hardware block. Incidentally, a plurality of blocks may be combined to form a single hardware block, or one block may be separated to form a plurality of hardware blocks.

In FIG. 6, the client 104 in FIG. 4 transmits a request to the recording server 103 for acquisition of the entire image 106 (tile image A11) in FIG. 5. When the system control unit 301 of the recording server 103 receives the image acquisition request via the communication unit 303, the system control unit 301 acquires the entire image 106 of the layer L1 from the recording unit 302 and transmits the entire image 106 to the client 104. When the client 104 receives the entire image 106 via the communication unit 401, the system control unit 403 of the client 104 causes the display unit 402 to display the entire image 106 (S1).

Next, when the user designates, for example, an area E1 of the entire image 106 as an attention area (S2), the system control unit 403 determines whether the area E1 is within one tile of each layer. Then, the system control unit 403 makes a request, via the communication unit 401, to the recording server 103 for a tile of the highest-numbered layer as one tile within which the area E1 is. For example, one tile of the highest-numbered layer within which the region of the area E1 of the entire image 106 in FIG. 5 is present is a tile image A37 of the image 108, and thus the system control unit 403 makes a request, via the communication unit 401, to the recording server 103 for the tile image A37.

Next, when the system control unit 301 of the recording server 103 receives the image acquisition request via the communication unit 303, the system control unit 301 acquires the tile image A37 from the recording unit 302 and transmits the tile image A37 to the client 104. When the client 104 receives the tile image A37 via the communication unit 401, the system control unit 403 clips the area E1 from the tile image A37 and causes the display unit 402 to display the area E1 (S3).

Next, when the user provides an instruction to perform a digital PT movement (S4), the system control unit 403 of the client 104 causes the display unit 402 to display an image clipped from the tile image A37 while an attention area is within the tile image A37. Then, assume that the user designates, for example, an area E2 as an attention area through the digital PT movement. At this time, when the system control unit 403 wants a tile image A38 adjacent to the tile image A37 to clip the attention area, the system control unit 403 makes a request to the recording server 103 for the tile images A37 and A38 via the communication unit 401. When the system control unit 301 of the recording server 103 receives the image acquisition request via the communication unit 303, the system control unit 301 transmits the tile images A37 and A38 from the recording unit 302 to the client 104.

Here, when the tile image A38 is an inter-frame compressed image, even if the tile image A38 is transmitted to the client 104 at a point in time when the tile image A37 can be transmitted, the client 104 is unable to display the tile image A38. For this reason, the system control unit 301 acquires only the tile image A37 from the recording unit 302 and transmits the tile image A37 to the client 104 via the communication unit 303. At this time, the system control unit 301 may notify the client 104 of the transmission of only the tile image A37. Then, at a point in time when the tile image A38 is converted into an intra-frame compressed image, the system control unit 301 transmits the tile image A38 to the client 104 via the communication unit 303.

Meanwhile, when the client 104 receives only the tile image A37 via the communication unit 401, the system control unit 403 clips an area closest to the area E2 from the tile image A37 and causes the display unit 402 to display the area. Subsequently, when the client 104 receives the tile images A37 and A38 via the communication unit 401, the system control unit 403 clips the area E2 from the tile images A37 and A38 and causes the display unit 402 to display the area E2 (S5).

Here, when the user moves the attention area through a digital PT movement, the client 104 has to switch between tile images to be displayed by the display unit 402 frequently. At this time, the client 104 is unable to display the attention area designated by the user until a point in time when a tile image corresponding to the attention area is converted into an intra-frame compressed image.

To reduce a waiting time before displaying the attention area designated by the user, the client 104 provides a display in such a manner as to switch between resolutions of clipped areas in accordance with a destination of the attention area subjected to the digital PT movement. At this time, during a request for a high-resolution image, the client 104 receives a low-resolution image including the area of the high-resolution image and uses the low-resolution image in the case of displaying an area outside the range of the high-resolution image, thereby reducing a time period before displaying the attention area during the digital PT movement.

For example, assume that the user designates the area E2 as an attention area while an image clipped from the tile image A37 in FIG. 5 is being displayed by the display unit 402. At this time, the system control unit 301 acquires a tile image A21 together with the tile image A37 from the recording unit 302 and transmits these tile images to the client 104 via the communication unit 303. Then, at a point in time when the tile image A38 is converted into an intra-frame compressed image, the system control unit 301 transmits the tile image A38 to the client 104 via the communication unit 303.

Meanwhile, when the client 104 receives the tile image A21 together with the tile image A37 via the communication unit 401, the system control unit 403 clips an area closest to the area E2 from the tile image A21 and causes the display unit 402 to display the area. Subsequently, when the client 104 receives the tile images A37 and A38 via the communication unit 401, the system control unit 403 clips the area E2 from the tile images A37 and A38 and causes the display unit 402 to display the area E2.

Furthermore, for example, assume that the user designates an area E3 as an attention area while an image clipped from the tile image A37 in FIG. 5 is being displayed by the display unit 402. The area E3 is not included in the tile image A21, but the area E3 is included in the tile image A11. For this reason, the system control unit 301 acquires the tile image A11 together with the tile image A37 from the recording unit 302 and transmits these tile images to the client 104 via the communication unit 303. Then, at a point in time when a tile image A36 is converted into an intra-frame compressed image, the system control unit 301 transmits the tile image A36 to the client 104 via the communication unit 303.

Meanwhile, when the client 104 receives the tile image A11 together with the tile image A37 via the communication unit 401, the system control unit 403 clips an area closest to the area E3 from the tile image A11 and causes the display unit 402 to display the area. Subsequently, when the client 104 receives the tile images A36 and A37 via the communication unit 401, the system control unit 403 clips the area E3 from the tile images A36 and A37 and causes the display unit 402 to display the area E3.

Figure 7:
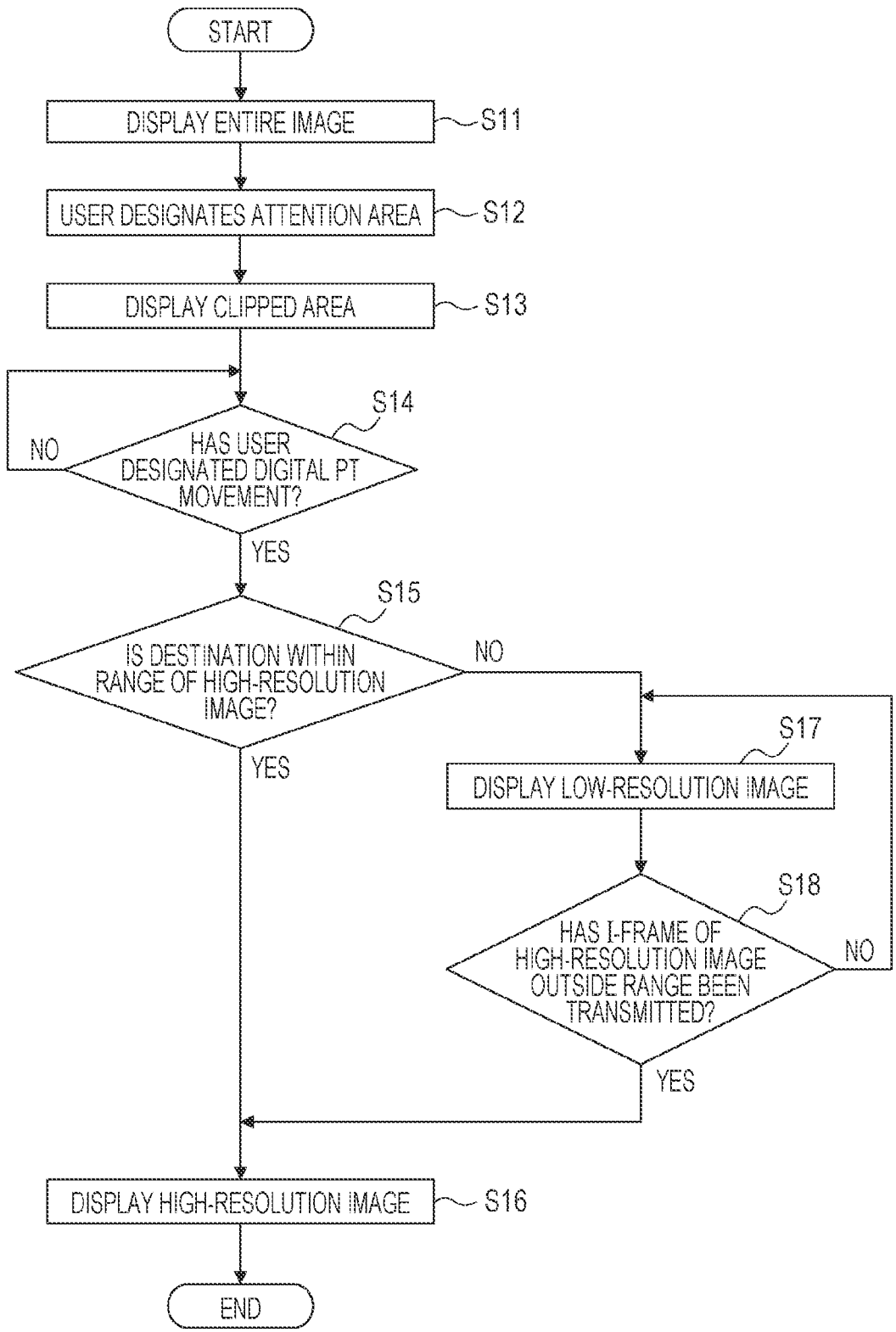
FIG. 7 is a flowchart illustrating an image display operation performed after a digital PT movement in FIG. 6 is designated.

FIG. 7 is a flowchart illustrating an image display operation performed after the digital PT movement in FIG. 6 is designated.

In FIG. 7, the client 104 in FIG. 4 transmits a request to the recording server 103 for acquisition of the entire image 106 (tile image A11) in FIG. 5. When the system control unit 301 of the recording server 103 receives the image acquisition request via the communication unit 303, the system control unit 301 acquires the entire image 106 of the layer L1 from the recording unit 302 and transmits the entire image 106 to the client 104. When the client 104 receives the entire image 106 via the communication unit 401, the system control unit 403 of the client 104 causes the display unit 402 to display the entire image 106 (S11).

Next, when the user designates, for example, the area E1 of the entire image 106 as an attention area (S12), the system control unit 403 determines whether the region of the area E1 is within one tile of each layer. Then, the system control unit 403 makes a request, via the communication unit 401, to the recording server 103 for a tile (here, the tile image A37) of the highest-numbered layer as one tile within which the area E1 is.

When the system control unit 301 of the recording server 103 receives the image acquisition request via the communication unit 303, the system control unit 301 acquires the tile image A37 from the recording unit 302 and transmits the tile image A37 to the client 104.

At this time, the system control unit 301 continues transmitting the entire image 106 that has been transmitted so far.

When the client 104 receives the tile image A37 via the communication unit 401, the system control unit 403 clips the area E1 from the tile image A37. Then, the system control unit 403 switches an image displayed by the display unit 402 from the entire image 106 to an image clipped from the tile image A37 (S13). The client 104 stores the entire image 106 transmitted together with the tile image A37 in the system control unit 403.

When the user provides an instruction to perform a digital PT movement (S14) while the image clipped from the tile image A37 is being displayed by the display unit 402, the system control unit 403 determines whether a destination subjected to the digital PT movement is within the range of the tile image A37 (S15). When an area designated by the user is within the range of the tile image A37, the system control unit 403 clips the area designated by the user from the tile image A37 and causes the display unit 402 to display the area (S16).

On the other hand, in S15, assume that the area designated by the user, for example, like the area E2 in FIG. 5 includes an area outside the range of the tile image A37. In this case, the system control unit 403 clips an area corresponding to the area E2 from the entire image 106 received together with the tile image A37 and causes the display unit 402 to display the area (S17). Thus, even if the area designated by the user includes an area outside the range of the tile image A37 and the system control unit 403 is unable to acquire the tile image A38 outside the range of the tile image A37 simultaneously with the tile image A37, the system control unit 403 can switch between displays smoothly.

Next, the system control unit 403 makes a request to the recording server 103 for the tile image A38 via the communication unit 401. When the system control unit 301 of the recording server 103 receives the image acquisition request via the communication unit 303, the system control unit 301 acquires the tile image A38 from the recording unit 302. Here, when the tile image A38 acquired from the recording unit 302 is an intra-frame compressed image, the system control unit 301 transmits the tile image A38 to the client 104 via the communication unit 303 without waiting for conversion into an intra-frame compressed image. On the other hand, when the tile image A38 acquired from the recording unit 302 is an inter-frame compressed image, the system control unit 301 waits for conversion into an intra-frame compressed image. At this time, the system control unit 301 may notify the client 104 that the system control unit 301 waits until the tile image A38 is converted into an intra-frame compressed image. Then, at a point in time when the tile image A38 is converted into an intra-frame compressed image, the system control unit 301 transmits the tile image A38 to the client 104 via the communication unit 303.

The system control unit 403 of the client 104 clips the area corresponding to the area E2 from the entire image 106 and determines, while causing the display unit 402 to display the area, whether the system control unit 403 has received the tile image A38 (S18). The system control unit 403 clips the area corresponding to the area E2 from the entire image 106 and causes the display unit 402 to display the area (S17) until the system control unit 403 receives the tile image A38. When the system control unit 403 receives the tile image A38, the system control unit 403 clips the area E2 from the tile images A37 and A38 and causes the display unit 402 to display the area E2 (S16).

Thus, as a result of a digital PT movement, when the client 104 wants the tile image A38 of the area E2 in FIG. 5, the client 104 temporarily uses an image obtained by clipping an area corresponding to the area E2 from the low-resolution image. This enables the client 104 to display an image of the area E2 in FIG. 5 continuously until the client 104 receives an intra-frame compressed image of a high-resolution image.

In this embodiment, although the client 104 uses the entire image 106 of the layer L1 as a low-resolution image to use, a tile image of the layer L2 may also be transmitted simultaneously with the entire image 106.

At this time, the recording server 103 transmits the tile image A21 corresponding to the tile image A37. When a digital PT movement to the area E2 is performed in S14, the client 104 only has to use the tile image A21 of the layer L2 in S17. When a digital PT movement to the area E3 is performed in S14, the client 104 is unable to use the tile image A21 of the layer L2 in S17 and thus only has to use the entire image 106 of the layer L1.

Furthermore, in this embodiment, although a digital PT movement in a horizontal direction is described, similar processing may be performed for a movement in a vertical direction as well.

As described above, an image reception apparatus as the client 104 according to the first embodiment acquires a low-resolution image including an area outside the range of a high-resolution image and displays the low-resolution image. Subsequently, the image reception apparatus acquires the high-resolution image and performs switching to a display of the high-resolution image. This keeps a waiting time for image switching involved in movement of a display range from increasing and also can increase the resolution of a display image.

Second Embodiment

In the first embodiment, during a request for a high-resolution image, a client receives a low-resolution image including the area of the high-resolution image and switches between display images in accordance with a display area, thereby enabling a display to be provided while reducing a waiting time even during a digital PT movement. In a second embodiment, the client makes a request, in accordance with the status of a digital PT movement, for suspension of transmission of a low-resolution image to be transmitted together with a high-resolution image, thereby inhibiting unnecessary consumption of bandwidth.

Figure 8:
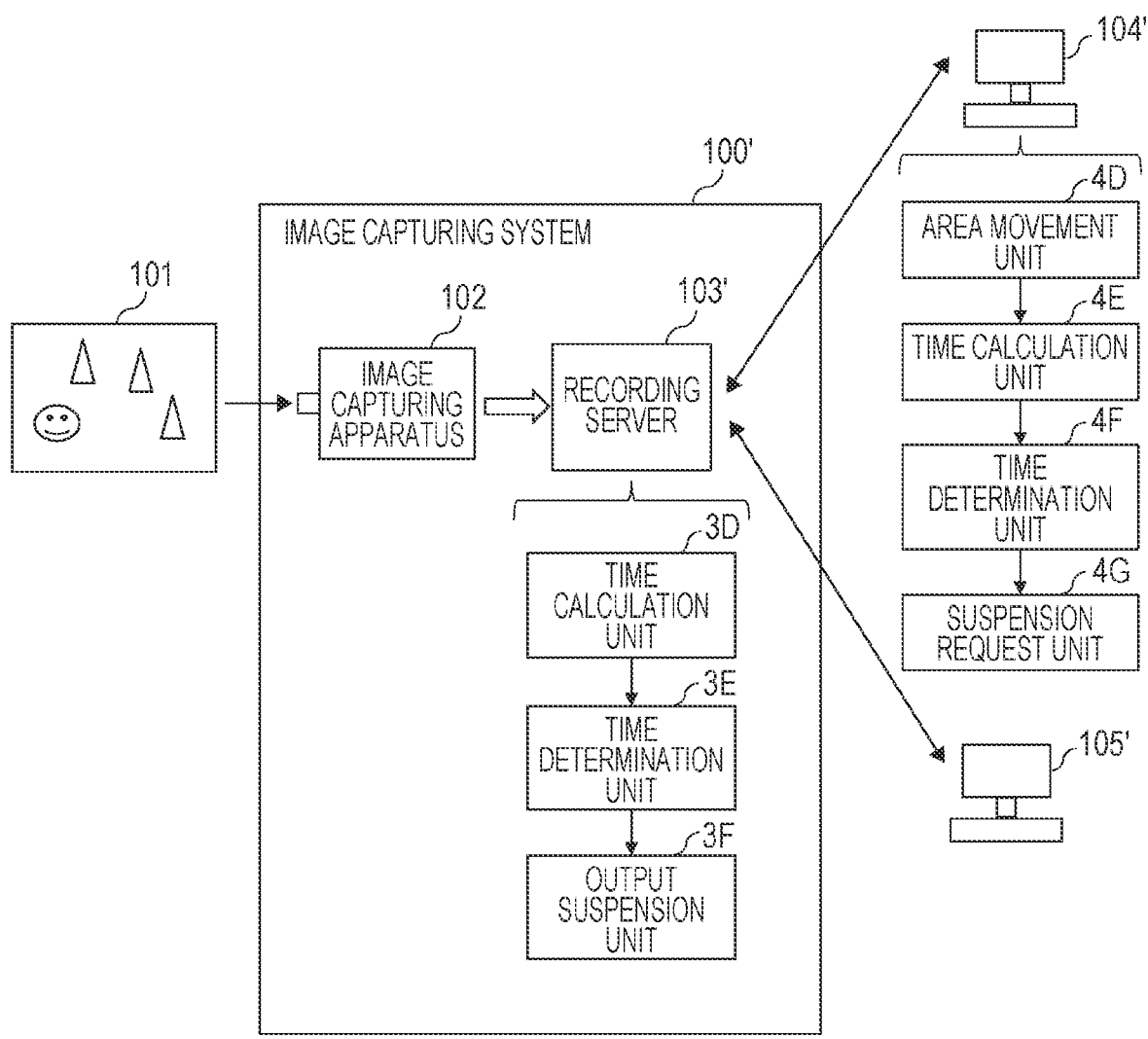
FIG. 8 is a block diagram illustrating an example of a configuration of an image distribution system according to a second embodiment.

FIG. 8 is a block diagram illustrating an example of a configuration of an image distribution system according to the second embodiment.

In FIG. 8, the image distribution system includes an image capturing system 100' and clients 104' and 105'. The image capturing system 100' includes the image capturing apparatus 102 and a recording server 103'.

In addition to the functions of the recording server 103 in FIG. 1, the recording server 103' has a function of suspending, in accordance with the status of receipt of a request for a high-resolution image, transmission of a low-resolution image to be transmitted in accordance with the request for the high-resolution image.

Here, the recording server 103' includes a time calculation unit 3D, a time determination unit 3E, and an output suspension unit 3F in addition to the components of the recording server 103 in FIG. 1. The time calculation unit 3D calculates a suspension time since receipt of a request for a high-resolution image from each of the clients 104' and 105'. The time determination unit 3E determines whether the suspension time calculated by the time calculation unit 3D is not less than a predetermined time period. When the suspension time calculated by the time calculation unit 3D is not less than the predetermined time period, the output suspension unit 3F suspends output of a low-resolution image.

In addition to the functions of each of the clients 104 and 105 in FIG. 1, each of the clients 104' and 105' has a function of making a request, in accordance with the status of a digital PT movement, for suspension of transmission of a low-resolution image to be transmitted in accordance with a request for a high-resolution image.

Here, the client 104' includes an area movement unit 4D, a time calculation unit 4E, a time determination unit 4F, and a suspension request unit 4G in addition to the components of the client 104 in FIG. 1. The area movement unit 4D moves an attention area of a display image displayed by the display unit 402. The time calculation unit 4E calculates a suspension time since movement of the attention area of the display image displayed by the display unit 402. The time determination unit 4F determines whether the suspension time calculated by the time calculation unit 4E is not less than a predetermined time period. When the suspension time calculated by the time calculation unit 4E is not less than the predetermined time period, the suspension request unit 4G makes a request for suspension of output of a low-resolution image. The client 105' can be configured as in the client 104'.

Here, when the client 104' makes a request to the image capturing system 100' for a high-resolution image included in a partial area of a low-resolution image, the image capturing system 100' outputs a low-resolution image including an area outside the range of the high-resolution image to the client 104'. When the client 104' acquires the low-resolution image from the image capturing system 100', the client 104' displays the low-resolution image.

When output of a high-resolution image is enabled after the low-resolution image is output, the image capturing system 100' outputs the high-resolution image requested from the client 104' to the client 104'. When the client 104' acquires the high-resolution image from the image capturing system 100', the client 104' switches the display of the low-resolution image to a display of the high-resolution image.

Here, assume that the client 104' moves an attention area on a display image. The display image may be a low-resolution image or may be a high-resolution image. At this time, the client 104' receives, from the image capturing system 100', a low-resolution image including the area of a high-resolution image corresponding to a destination of the attention area and switches between images to be used to be displayed in accordance with the attention area. When movement of the attention area is suspended on the display image, the client 104' calculates a suspension time during which movement of the attention area is suspended and determines whether the suspension time is not less than the predetermined time period.

When the suspension time during which movement of the attention area is suspended is not less than the predetermined time period, the client 104' makes a request to the image capturing system 100' for suspension of output of the low-resolution image.

When a request is made for suspension of output of the low-resolution image, the image capturing system 100' suspends output of the low-resolution image. Thus, when the client 104' does not move the attention area and does not have to use the low-resolution image, output of the low-resolution image can be suspended and unnecessary consumption of bandwidth can be inhibited.

In the above description, a method is provided in which the client 104' determines whether to make a request for suspension of output of the low-resolution image and makes a request to the image capturing system 100' for suspension of output of the low-resolution image.

In addition to this method, the image capturing system 100' may be configured to determine whether to suspend output of the low-resolution image and suspend output of the low-resolution image.

At this time, the recording server 103' calculates a suspension time since receipt of a request for a high-resolution image from each of the clients 104' and 105' and determines whether the suspension time is not less than the predetermined time period. When the suspension time since receipt of the request for the high-resolution image is not less than the predetermined time period, output of the low-resolution image is suspended.

Figure 9:
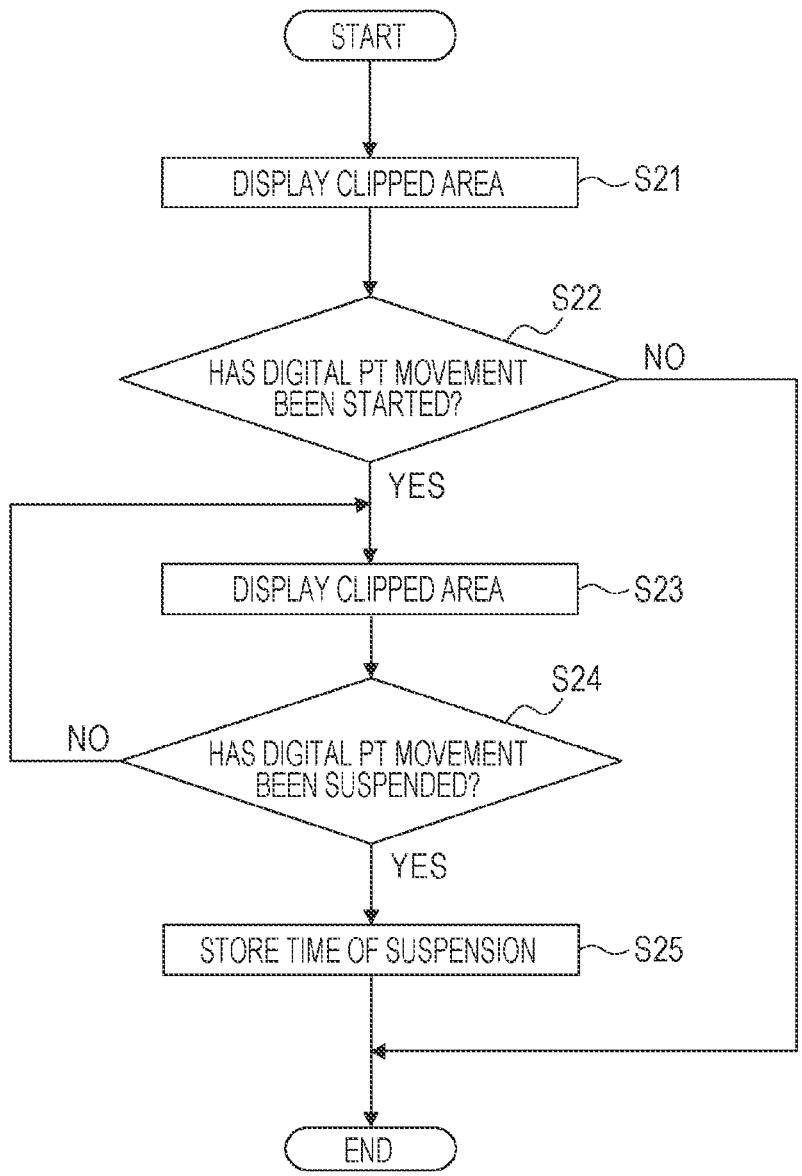
FIG. 9 is a flowchart illustrating an operation performed during performance of a digital PT movement according to the second embodiment.

FIG. 9 is a flowchart illustrating an operation performed during performance of a digital PT movement according to the second embodiment.

In FIG. 9, the system control unit 403 makes a request to the recording server 103 for a tile image of the layer L3 including an attention area designated by the user and the entire image 106 of the layer L1 and receives these images via the communication unit 401. Then, the system control unit 403 causes the display unit 402 to display an image obtained by clipping the attention area from the tile image of the layer L3 (S21).

Next, the system control unit 403 determines whether the user has started to provide an instruction to perform a digital PT movement via the input unit 404 (S22). When a digital PT movement is not started, the system control unit 403 ends the process.

On the other hand, when a digital PT movement is started, the system control unit 403 displays an image obtained by clipping an attention area from a tile image of the layer L3 (S23).

Next, the system control unit 403 determines whether the digital PT movement has been suspended (S24). Then, the system control unit 403 changes the attention area until the digital PT movement is suspended and displays an image obtained by clipping an attention area from a tile image of the layer L3 (S23).

On the other hand, when the user suspends the digital PT movement via the input unit 404 in S24, the system control unit 403 stores therein information on the time at which the digital PT movement was suspended (S25).

Figure 10:
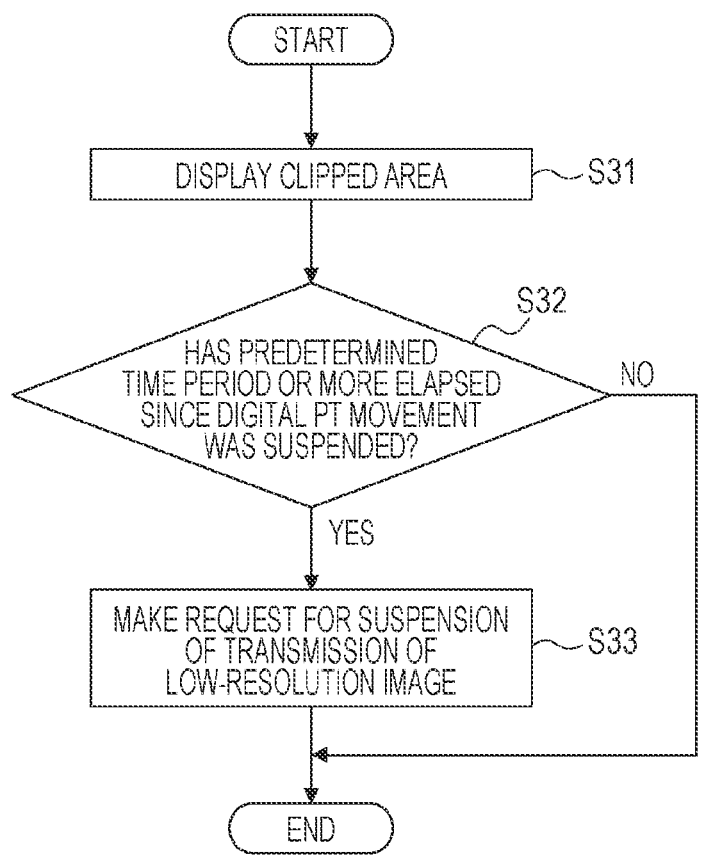
FIG. 10 is a flowchart illustrating an operation performed after the digital PT movement according to the second embodiment is suspended.

FIG. 10 is a flowchart illustrating an operation performed after the digital PT movement according to the second embodiment is suspended.

In FIG. 10, the system control unit 403 makes a request to the recording server 103 for a tile image of the layer L3 including an attention area designated by the user and the entire image 106 of the layer L1 and receives these images via the communication unit 401. Then, the system control unit 403 causes the display unit 402 to display an image obtained by clipping the attention area from the tile image of the layer L3 (S31).

Next, the system control unit 403 calculates, from the time of suspension at which the digital PT movement was suspended and that has been stored in S25 in FIG. 9 and the current time, a time period that has elapsed since the digital PT movement was suspended. Then, the system control unit 403 compares the time period that has elapsed since the digital PT movement was suspended with a threshold stored in advance and determines whether the time period that has elapsed since the digital PT movement was suspended is not less than the threshold (S32). When the time period that has elapsed since the digital PT movement was suspended is less than the threshold, the system control unit 403 ends the process.

On the other hand, when the time period that has elapsed since the digital PT movement was suspended is not less than the threshold, the system control unit 403 makes a request to the recording server 103' for suspension of transmission of the entire image 106 of the layer L1 via the communication unit 401 (S33).

Thus, the recording server 103' suspends transmission of a low-resolution image when the predetermined time period or more elapses since the digital PT movement, thereby making it possible to inhibit unnecessary consumption of bandwidth under circumstances where the digital PT movement is not being performed and the low-resolution image does not have to be used.

In this embodiment, although the recording server 103' transmits the entire image 106 of the layer L1 as a low-resolution image, the recording server 103' may also transmit a tile image of the layer L2 simultaneously with the entire image 106. On this occasion, in S33, the system control unit 403 makes a request to the recording server 103' via the communication unit 401 for suspension of transmission of the entire image 106 of the layer L1 and the tile image of the layer L2.

As described above, an image reception apparatus as the client 104 according to the second embodiment makes a request, in accordance with the status of a digital PT movement, for suspension of transmission of a low-resolution image to be transmitted in accordance with a request for a high-resolution image, thereby making it possible to inhibit unnecessary consumption of bandwidth.

Other Embodiments

Figure 11:
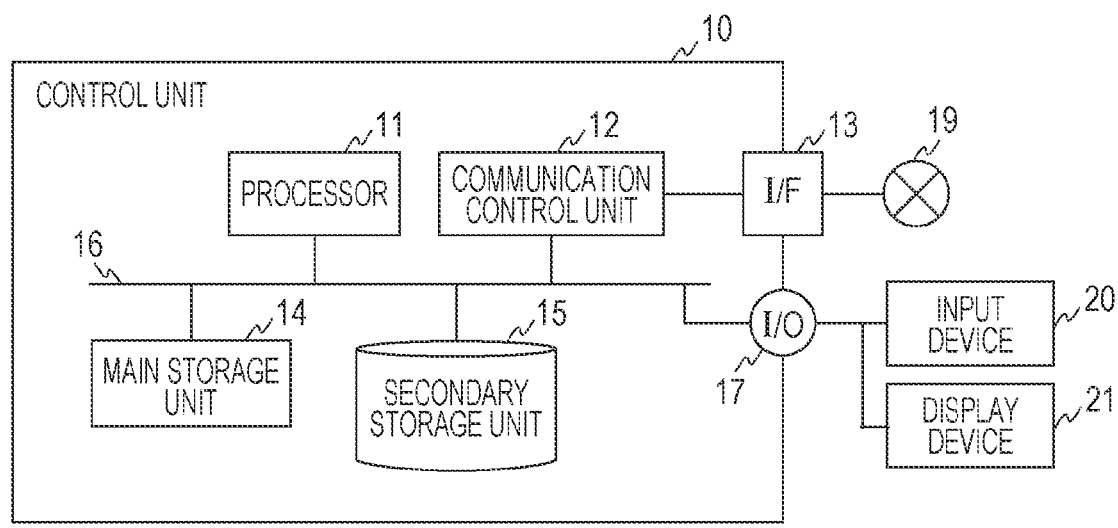
FIG. 11 is a block diagram illustrating an example of a hardware configuration of a client according to an embodiment.

FIG. 11 is a block diagram illustrating an example of a hardware configuration of a client according to an embodiment. Incidentally, this hardware configuration may be used in each of the clients 104 and 105 in FIG. 1 or may be used in each of the clients 104' and 105' in FIG. 8. Furthermore, this hardware configuration may be applied to the recording server 103 in FIG. 1 or may be applied to the recording server 103' in FIG. 8.

In FIG. 11, a control unit 10 includes a processor 11, a communication control unit 12, a communication interface 13, a main storage unit 14, a secondary storage unit 15, and an input-output interface 17. The processor 11, the communication control unit 12, the communication interface 13, the main storage unit 14, the secondary storage unit 15, and the input-output interface 17 are connected to one another via an internal bus 16. The main storage unit 14 and the secondary storage unit 15 are accessible to the processor 11.

Furthermore, an input device 20 and a display device 21 are provided outside the control unit 10. The input device 20 and the display device 21 are connected to the internal bus 16 via the input-output interface 17. Examples of the input device 20 include a keyboard, a mouse, a touch screen, a card reader, and a voice input device. Examples of the display device 21 include a liquid crystal monitor, an organic EL display, and a micro-LED display.

The processor 11 is responsible for controlling operation of the entire control unit 10. The processor 11 may be a CPU or may be a graphics processing unit (GPU). The processor 11 may be a single-core processor or may be a multi-core processor. The processor 11 may include a hardware circuit (for example, an FPGA or ASIC), such as an accelerator that increases the speed of part of processing.

The main storage unit 14 can be a semiconductor memory, such as a static random access memory (SRAM) or dynamic random access memory (DRAM). In the main storage unit 14, a program being executed by the processor 11 can be stored, and a work area for the processor 11 executing a program can be provided.

The secondary storage unit 15 is a non-volatile storage device, such as a ROM, hard disk drive, or solid state drive (SSD). The secondary storage unit 15 can store executable files of various programs, and data used for executing a program.

The communication control unit 12 is hardware having a function of controlling communication with the outside world. The communication control unit 12 is connected to a network 19 via the communication interface 13. The network 19 may be the Internet, a WAN, or a LAN, such as a WiFi or Ethernet (registered trademark) network. Alternatively, the Internet, the WAN, and the LAN may coexist.

The input-output interface 17 converts data input from the input device 20 into a data format processable by the processor 11 or converts data output from the processor 11 into a data format processable by the display device 21.

The processor 11 reads a program stored in the secondary storage unit 15 into the main storage unit 14 and executes the program, thereby enabling implementation of the processes of FIGS. 6, 7, 9, and 10.

Incidentally, the execution of programs for implementing the processes of FIGS. 6, 7, 9, and 10 may be assigned to a plurality of processors or computers. Alternatively, the processor 11 may instruct, for example, a cloud computer via the network 19 to execute all or some of the programs for implementing the processes of FIGS. 6, 7, 9, and 10 to receive the execution results of the programs.

In the present disclosure, a program that implements one or more functions of the above-described embodiments may be supplied to a system or apparatus via a network or a storage medium. The one or more functions of the above-described embodiments can also be implemented by causing one or more processors of a computer in the system or apparatus to read and execute the program. Furthermore, the one or more functions of the above-described embodiments can also be implemented by a circuit (for example, an FPGA or ASIC) that implements one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-195015 filed Nov. 25, 2020, which is hereby incorporated by reference herein in its entirety.

What is claimed is:

1. An image reception apparatus comprising:
  a display configured to display an image received from an image transmission apparatus;
  at least one memory; and
  at least one processor configured to communicate with the memory, wherein the at least one processor is configured to act as:
    a reception unit configured to receive a first image from an-the image transmission apparatus;
    a transmission unit configured to transmit information on an attention area designated by a user in the first image to the image transmission apparatus;
    a movement unit configured to move the attention area of a display image; and
    a determination unit configured to determine whether a destination of the attention area is within a range of one or more partial images,
  wherein, when the transmission unit transmits the information to the image transmission apparatus, the reception unit receives, from the image transmission apparatus, the first image together with one or more partial images corresponding to the attention area and constituting a second image of a resolution higher than a resolution of the first image,
  wherein the display displays the one or more partial images when the destination of the attention area is within the range of the one or more partial images, and displays the first image when the destination of the attention area is outside the range of the one or more partial images, and
  wherein the display displays, after the reception unit receives new one or more partial images corresponding to an area of the destination of the attention area and constituting the second image, the received new one or more partial images.

2. An image transmission apparatus to transmit an image to an image reception apparatus to display the imae on a display, comprising:
  at least one memory; and
  at least one processor configured to communicate with the memory, wherein the at least one processor is configured to act as:
    a transmission unit configured to transmit a first image to the image reception apparatus;
    a reception unit configured to receive information on an attention area designated by a user in the first image from the image reception apparatus and receive information on movement in the attention area; and;
  wherein, when the reception unit receives the information from the image reception apparatus, the transmission unit transmits, to the image reception apparatus, the first image together with one or more partial images corresponding to the attention area and constituting a second image of a resolution higher than a resolution of the first image,
  wherein the display displays the one or more partial images when the destination of the attention area is within the range of the one or more partial images, and displays the first image when the destination of the attention area is outside the range of the one or more partial images,
  wherein, when the destination of the attention area is outside the range of the one or more partial images, the display displays the first image, and displays, after the image reception apparatus receives new one or more partial images corresponding to an area of the destination of the attention area and constituting the second image, the received new one or more partial images.

3. The image transmission apparatus according to claim 2, wherein the determination unit is configured to determine whether the destination of the attention area is within a the range of the one or more partial images,
  wherein the transmission unit transmits the first image together with the one or more partial images to the image reception apparatus when the destination of the attention area is within the range of the one or more partial images, and transmits the first image to the image reception apparatus when the destination of the attention area is outside the range of the one or more partial images.

4. The image transmission apparatus according to claim 3, wherein, when the destination of the attention area is outside the range of the one or more partial images, the transmission unit transmits the first image to the image reception apparatus, and transmits new one or more partial images corresponding to an area of the destination of the attention area and constituting the second image.

5. The image transmission apparatus according to claim 2, wherein the at least one processor is further configured to act as:
  a generation unit configured to generate a partial image obtained by spatially dividing the second image; and
  an encoding unit configured to encode the partial image,
  wherein the transmission unit transmits the partial image encoded by the encoding unit.

6. The image transmission apparatus according to claim 2, wherein the one or more partial images are each an intra-frame compressed image or an inter-frame compressed image.

7. The image transmission apparatus according to claim 2, further comprising:
  an image capturing unit configured to capture an image of a subject.

8. A method comprising:
  receiving a first image from an image transmission apparatus;
  transmitting information on an attention area designated by a user in the first image to the image transmission apparatus;
  moving the attention area of a display image;
  determining whether a destination of the attention area is within a range of one or more partial images; and
  displaying an image received from the image transmission apparatus,
  when the information is transmitted to the image transmission apparatus, receiving, from the image transmission apparatus, the first image together with one or more partial images corresponding to the attention area and constituting a second image of a resolution higher than a resolution of the first image, wherein the one or more partial images is displayed when the destination of the attention area is within the range of the one or more partial images, and displays the first image when the destination of the attention area is outside the range of the one or more partial images, wherein the display displays, after receiving new one or more partial images corresponding to an area of the destination of the attention area and constituting the second image, the received new one or more partial images.

9. The method according to claim 8, further comprising:

moving an attention area of a display image;

determining whether a destination of the attention area is within a range of the one or more partial images; and displaying the one or more partial images when the destination of the attention area is within the range of the one or more partial images, and displaying the first image when the destination of the attention area is outside the range of the one or more partial images.

10. The method according to claim 9, further comprising, when the destination of the attention area is outside the range of the one or more partial images, displaying the first image, and displaying, after receiving new one or more partial images corresponding to an area of the destination of the attention area and constituting the second image, the received new one or more partial images.

11. A method comprising:

transmitting a first image to an image reception apparatus;

receiving information on an attention area designated by a user in the first image from the image reception apparatus and receive information on movement in the attention area; and when the information is received from the image reception apparatus, transmitting, to the image reception apparatus, the first image together with one or more partial images corresponding to the attention area and constituting a second image of a resolution higher than a resolution of the first image, wherein the one or more partial images is displayed when the destination of the attention area is within the range of the one or more partial images, and displays the first image when the destination of the attention area is outside the range of the one or more partial images, wherein, when the destination of the attention area is outside the range of the one or more partial images, the first image is displayed, and displays, after the image reception apparatus new one or more partial images corresponding to an area of the destination of the attention area and constituting the second image, the received new one or more partial images.

12. The method according to claim 11, further comprising:

determining whether a destination of the attention area is within a range of the one or more partial images; and transmitting the first image together with the one or more partial images to the image reception apparatus when the destination of the attention area is within the range of the one or more partial images, and transmitting the first image to the image reception apparatus when the destination of the attention area is outside the range of the one or more partial images.

13. The method according to claim 12, further comprising, when the destination of the attention area is outside the range of the one or more partial images, transmitting the first image to the image reception apparatus, and transmitting new one or more partial images corresponding to an area of the destination of the attention area and constituting the second image.

14. A non-transitory computer-readable recording medium in which a program is recorded for causing a computer to ccrvc as execute the method according to claim 8.

15. A non-transitory computer-readable recording medium in which a program is recorded for causing a computer to execute the method according to claim 11.

* * * * *